Sept. 5, 1933.  C. S. GLENN  1,925,799
CHEMICAL MANUFACTURE
Filed March 24, 1932
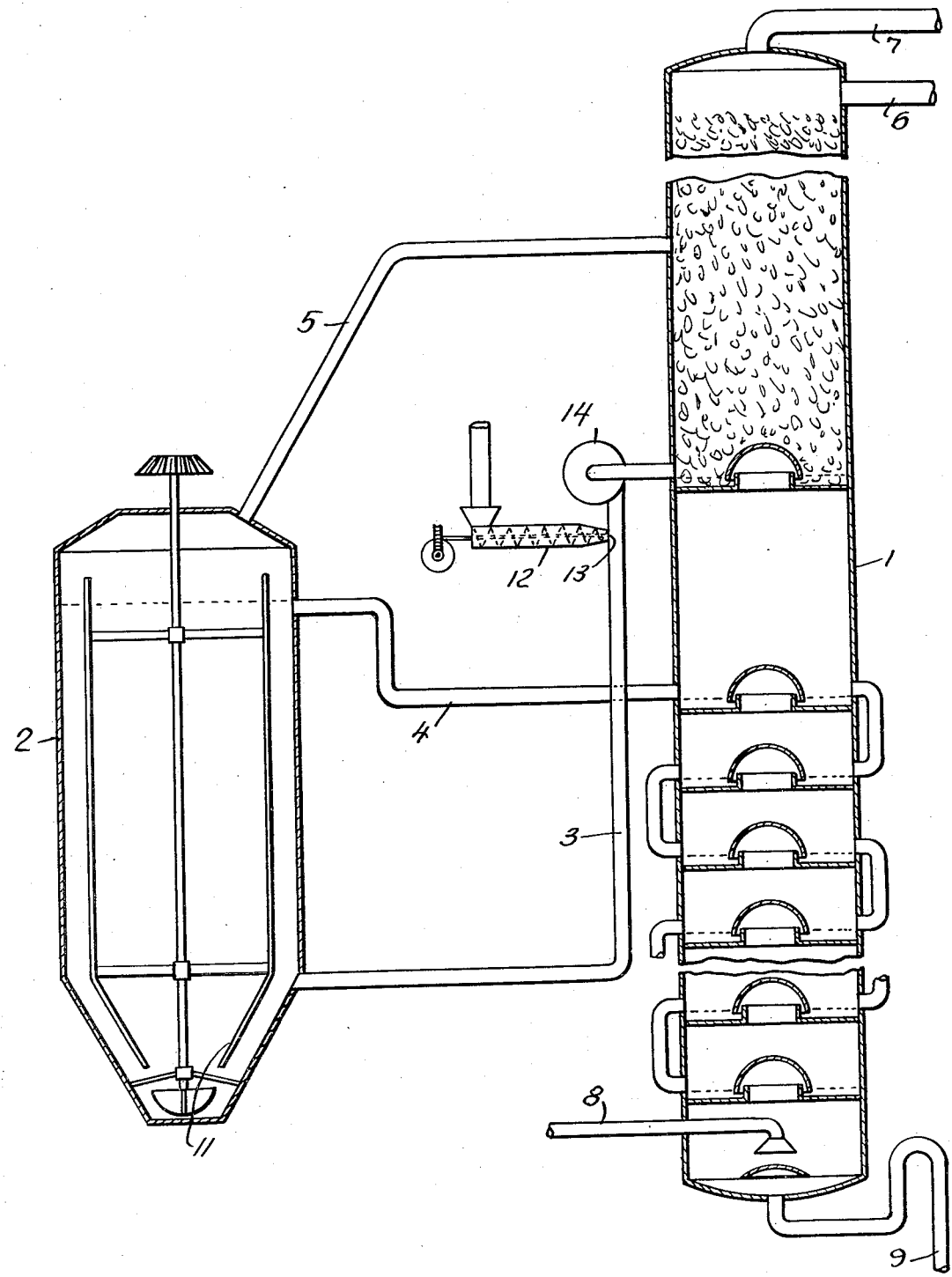
INVENTOR
Charles S. Glenn
BY
Pennie, Davis, Marvin & Edmonds
ATTORNEYS

UNITED STATES PATENT OFFICE 1,925,799

CHEMICAL MANUFACTURE

Charles S. Glenn, Syracuse, N. Y., assignor to The Mathieson Alkali Works, Inc., New York, N. Y., a corporation of Virginia Application March 24, 1932. Serial No. 600,895

3 Claims. (Cl. 202—57)

This invention relates to improvements in the distillation of ammonia from ammoniacal brines involving, as in the distillation of ammonia from ammonium carbonate-ammonium chloride brines in the ammonia-soda process, the addition of lime to the brine to liberate the ammonia.

Originally, in the ammonia-soda process, the distillation of ammonia from the ammoniacal brine was accomplished by the addition of dry lime to the brine in a batch operation. Although the use of dry lime in this distillation, as compared to the use of milk of lime, affords important advantages with respect to heat economy, recovery of ammonia and increase in effective capacity of the apparatus used, the use of milk of lime has generally been adopted in continuous operation because of lack of a workable method of using dry lime in continuous operation.

When dry lime contacts with an ammoniacal brine, gas is rapidly evolved and a hard scale is rapidly formed. If dry lime is introduced into a body of the brine from above a free surface, a pasty mass tends to form which floats on the surface choking gas outlets from the receptacle above the surface and liquid outlets adjacent the surface. If dry lime is introduced into a body of the brine at a point below the surface, the opening through which it is introduced tends to choke through formation of this scale.

I have found, however, that if dry lime is introduced into a stream of the brine at a point of high velocity as a succession of compressed slugs of pulverulent lime and the stream of brine and introduced slugs then discharged into a body of the brine including introduced lime maintained in agitation, difficulties due to gas evolution and scale formation are avoided. The stream of brine into which the compressed slugs of pulverulent lime are introduced is with advantage discharged into and beneath the surface of the body of brine. The velocity of the stream of brine at the point of lime introduction minimizes deposition in this region of any scale formed and also carries any gas formed in this region into the body of brine. However, the compressed slugs of pulverulent lime do not seem to be wetted immediately so that reactions between the lime and the brine take place, for the most part, in the agitated body of brine throughout which the added lime is dispersed. Localization of the reaction thus being avoided, it takes place smoothly and uniformly and, the added lime being at all times submerged, formation of the pasty mass to which reference has been made is avoided.

One form of apparatus embodying the invention and adapted for use in practicing the invention is illustrated, diagrammatically and conventionally, in elevation and partly in section and with parts broken away, in the accompanying drawing, in connection with which the invention will be further described.

Referring to the drawing, the apparatus illustrates a distillation column 1, a mixing tank 2, and connections 3 for circulating brine from the distillation column to the mixing tank, connections 4 for circulating brine from the mixing tank to the distillation column and connections 5 for discharging gas from the mixing tank into the distillation column. The distillation column may be the conventional column for the distillation of ammonia from ammoniacal brines such as is commonly used in the ammonia-soda process. The ammoniacal brine is supplied to the upper end of the distillation column through connection 6, the ammonium carbonate content of the brine is decomposed by heat in the upper part of the column and the ammonium chloride content of the brine is decomposed, by the addition of lime, in the mixing tank 2, and to some extent in some cases in the lower part of the column, the liberated ammonia is discharged to recovery apparatus through connection 7, the ammonia liberated in the mixing tank 2 being discharged into the upper part of the column through connection 5, steam to effect the distillation is supplied through connection 8 and the brine stripped of ammonia is discharged from the lower end of the distillation column through connection 9, the operation being substantially continuous. The mixing tank 2 contains an agitator 11 adapted to maintain vigorous agitation within the mixing tank.

In accordance with this invention, dry lime is added to the brine circulating as a rapidly flowing stream from the distillation column to the mixing tank through connection 3 as a succession of compressed slugs of pulverulent lime. The introduction of the dry lime is effected by means of a screw propelling mechanism 12 discharging through an orifice 13 of diameter somewhat less than that of the circulating connection 3. This screw propelling mechanism is proportioned to pack the lime passing through the orifice tightly enough to prevent the escape through this mechanism of brine flowing through the connection 3. To maintain sufficient velocity through connection 3 past the orifice 13, a pump 14 may be provided.

In carrying out the invention in the apparatus illustrated, the ammoniacal brine is circulated from the distillation column 1 to the mixing tank 2 through connection 3 as a rapidly flowing confined stream, dry lime is introduced into this rapidly flowing stream of brine through orifice 13 as a succession of compressed slugs of pulverulent lime, the brine and introduced lime and the products of any reaction occurring in connection 3 are carried into a body of brine including introduced lime maintained in agitation in the mixing tank 2, connection 3 discharging into the mixing tank 2 below the normal liquid level therein, the greater part of the reaction between the introduced lime and the ammoniacal brine is effected in the mixing tank 2, gas formed being discharged into the distillation column 1 through connection 5, and brine including introduced lime in the form of dissolved or suspended reaction products for the most part, is circulated from the mixing tank to the distillation column 1 through connection 4.

Ordinarily the addition of lime is proportioned so as to be approximately equivalent, stoichiometrically, to the ammonium compounds thereby to be decomposed. The invention is, however, applicable where the proportion of lime to be added is more or less than this proportion.

I claim:

1. In the distillation of ammonia from ammoniacal brines, the improvement which comprises circulating the brine from a distillation column to a mixing tank as a rapidly flowing confined stream, introducing dry lime into said rapidly flowing stream as a succession of compressed slugs of pulverulent lime, maintaining a body of brine including introduced lime in agitation in said mixing tank, and circulating brine from said mixing tank to said distillation column.

2. In the distillation of ammonia from ammoniacal brines, the improvement which comprises circulating the brine from a distillation column to a mixing tank as a rapidly flowing confined stream, said stream being discharged into and beneath the surface of a body of brine maintained in said mixing tank, introducing dry lime into said rapidly flowing stream as a succession of compressed slugs of pulverulent lime, maintaining said body of brine including introduced lime in agitation in said mixing tank, and circulating brine from said mixing tank to said distillation column.

3. In apparatus for the distillation of ammonia from ammoniacal brine, a distillation column, a mixing tank, an agitator in the mixing tank, a connection for circulating brine from the distillation column to the mixing tank as a rapidly flowing confined stream, said connection having a lateral orifice, means for compressing dry lime and discharging it in the form of compressed slugs through said orifice into said connection and a connection for circulating brine from the mixing tank to the distillation column.

CHARLES S. GLENN.